UNITED STATES PATENT OFFICE.

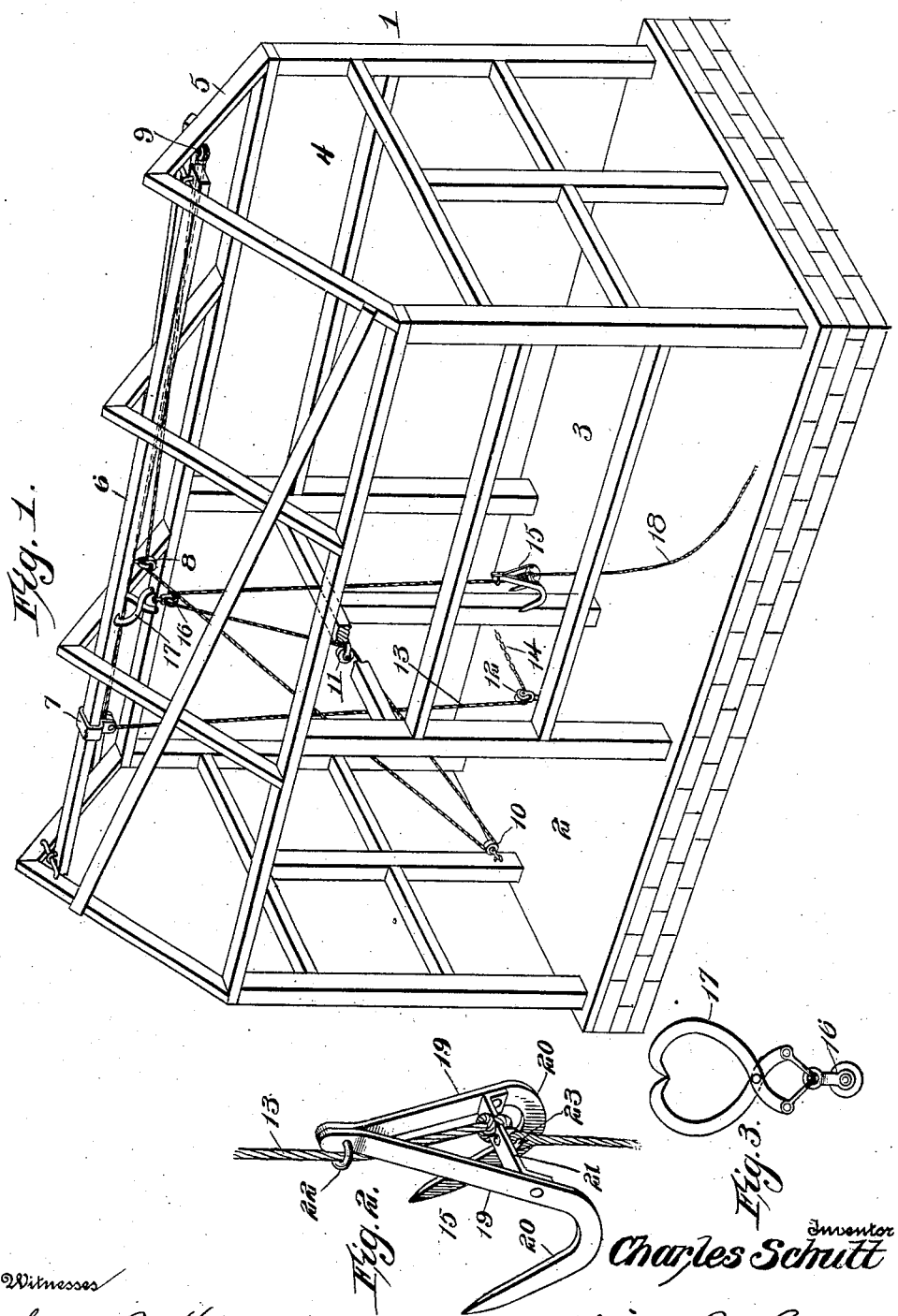

CHARLES SCHUTT, OF BAY PORT, MICHIGAN.

DEVICE FOR LEVELING HAY.

No. 854,608.　　　　Specification of Letters Patent.　　　　Patented May 21, 1907.

Application filed April 28, 1906. Serial No. 314,221.

*To all whom it may concern:*

Be it known that I, CHARLES SCHUTT, a citizen of the United States, residing at Bay Port, in the county of Huron and State of Michigan, have invented new and useful Improvements in Devices for Leveling Hay, of which the following is a specification.

My invention relates to devices for leveling hay, and its primary object is to provide a novel and highly useful device of this character which may be used in connection with any construction of hay rick or barn, one which is simple and durable and one which may be manufactured, sold and erected at a comparatively low cost.

With the above and other objects in view, the invention consists in the construction, combination and arrangement of parts hereinafter fully described, claimed and illustrated in the accompanying drawings, wherein:

Figure 1 is a perspective view of the frame of a barn, illustrating the manner in which my improved leveling device may be erected. Fig. 2 is a perspective view of the leveling fork, and Fig. 3 is a view in elevation of the grapple.

Referring to the drawings by reference numerals, 1 designates a frame of a barn, which is provided with a driveway 2 and a hay rick 3. One end of the barn is provided with an opening 4 through which hay may be thrown into the rick 3. Secured to the upper rafters 5 of the barn is a bar 6, to which is secured a pulley 7 arranged above the driveway 2 and a pulley 8 arranged above the rick 3. Secured to one of the rafters 5 adjacent the opening 4 is a pulley 9, and pulleys 10, 11 and 12 are secured to the frame-work at suitable points in the driveway 2. A cable 13 is threaded over the pulleys 12, 7, 9, 8, 10 and 11, as illustrated in Fig. 1 of the drawings. A chain 14 is secured to one end of the cable 13 and is adapted to be connected to a suitable draft device, while a leveling fork 15 is secured to the other end of the cable. The cable is also threaded over a pulley 16 carried by a grapple 17, which is adapted to be detachably secured to the bar 6 in a manner that should be apparent. The grapple 17 is preferably secured to the bar 6 at the inner end of the rick 3 so that when power is applied to the cable, the leveling fork is caused to travel from one end of the rick to the other. In order to position the leveling fork to any point within the rick removed from the pulley 16, a controlling rope 18 is secured thereto.

The operation of the device may be stated to be as follows: After a load of hay has been thrown into the rick through the opening 4, it is desired to level the hay over the floor of the rick 3 so as to better adapt the rick for the reception of the next load of hay. By leveling each load of hay as it is deposited in the rick the storing of the hay is materially facilitated. After a load of hay has been deposited in the rick, the leveling fork is brought to the outer end of the hay rick by means of the rope 18 and caused to engage the hay, after which power is applied to the cable 13 to throw the leveling fork to the inner end of the rick.

The leveling fork comprises two members 19 united at their upper ends and having their lower ends bent to provide hay engaging members 20. The members 19 are separated at their bent ends to properly space the hay engaging members 20 and are held in this position by means of a brace 21. The upper united ends of the members 19 are provided with a ring 22 through which passes the cable 13, the end thereof being secured to the brace 21, which is provided with an eye 23 to which is attached one end of the rope 18.

It should be apparent from the above description, taken in connection with the accompanying drawings, that the arrangement of the pulleys is such that little power is required to move the leveling fork 15 to level the hay and to move the same to place it in position to level the hay, and that the device is simple, cheap and readily erected.

Having fully described and illustrated my invention, what I claim is:

The herein described device for leveling hay, comprising a bar suspended at the upper part of a barn, pulleys suspended from said bar, a cable passed through said pulleys and having one of its ends attached to a draft device, a grapple connected to said bar, a pulley suspended from said grapple, a leveling fork connected to said cable, essentially as described.

In testimony whereof, I affix my signature in presence of two witnesses.

CHARLES SCHUTT.

Witnesses:
　ERNEST CLABUSET,
　F. W. MERRICK.